(No Model.) 6 Sheets—Sheet 2.
M. P. BROWN.
CORN PLANTER.

No. 320,044. Patented June 16, 1885.

Attest:
Charles Pickles
Wm. J. Sayers

Inventor:
Mercileus P. Brown
By Knight Bro.
Attys (No Model.) 6 Sheets—Sheet 3.

M. P. BROWN.
CORN PLANTER.

No. 320,044. Patented June 16, 1885.

(No Model.)

M. P. BROWN.
CORN PLANTER.

No. 320,044. Patented June 16, 1885.

Attest:
Charles Pickles
Wm. J. Sayers

Inventor:
Mercileus P. Brown
By Knight Bros.
Attys.

(No Model.) 6 Sheets—Sheet 6.

M. P. BROWN.
CORN PLANTER.

No. 320,044. Patented June 16, 1885.

Attest:
Charles Pickles
Wm. H. Sayers

Inventor:
Mercileus P. Brown
By Knight Bros.
Attys

UNITED STATES PATENT OFFICE.

MERCILEUS P. BROWN, OF FAYETTEVILLE, MISSOURI.

CORN-PLANTER.

SPECIFICATION forming part of Letters Patent No. 320,044, dated June 16, 1885.

Application filed August 1, 1883. (No model.)

*To all whom it may concern:*

Be it known that I, MERCILEUS P. BROWN, of Fayetteville, in the county of Johnson and State of Missouri, have invented certain new and useful Improvements in Corn-Planters, of which the following is a specification, reference being had to the accompanying drawings, forming part of the same.

This invention is an improvement on the corn-planter patented to me the 14th of November, 1879, No. 221,282.

My present invention applies to certain improvements on both the dropping and the regulating mechanism, and to the machine in general, as fully set forth hereinafter.

In the drawings, Fig. 36 is a section at 36 36, Fig. 30. Fig. 51 is a section at 51 51, Fig. 43. Fig. 52 is a section at 52 52, Fig. 43.

The machine has two ground-wheels, A and B. The wheel A merely supports its own side of the machine, and serves to compact the earth upon the corn as usual, but the wheel B, in addition to supporting its own side of the machine, actuates the seed-driving mechanism. The axle C of the wheel A is at a lower elevation than the axle D of the drive-wheel B, and may be bolted directly to the cross-bar of the frame, as shown. The axle of the drive-wheel B is raised above the frame of the planter to suit the larger diameter of the wheel B over the wheel A. The wheel B is made of a suitable circumference to overcome the resistance of clods, &c., and assure regularity in the revolution of the wheel. The axle of this wheel is upon a standard, D', secured to one of the bars of the frame, the longitudinal bars being shown at E and the cross or transverse bars at F. The cross-bar or roller G is made capable of turning on gudgeons *g* at the ends, and to this bar G the tongue H is secured. I I are the openers or shares by which the furrows are made to receive the seed.

J is a central plow, which skims over the surface of the ground, and through which drops the marking material—such as lime—to indicate the position of each alternate hill in the line in the furrows or rows. This marking device is described in my former patent, to which allusion has been made in the preceding part of this specification, and as no novelty is claimed for it in this application no further description is here needed.

The bar G, to which the tongue is secured, is connected to the side bars, E, by gudgeons $g$, one at each end. Thus the tongue admits of adjustment upon the frame, to run the openers at a greater or less depth in the earth. The opener-standards, seed-bar, seed-boxes, and tongue are all connected to the roller or bar G.

K K are hounds attached at the front ends to a cross-bar, L, that is secured to the tongue, and extending backward over the bar G, to which they are secured. The rear ends of the hounds are connected together by a casting, K', to which is hinged the lower end of a cog-rack, M. The cogs of this rack engage a cog-wheel, N, turning in bearings at the fore end of the frame O. The cog-wheel is upon a shaft turned by a handle, N', to raise or lower the cog-rack, and thus raise or lower the openers or shares I in the earth, for it will be understood that the point of the tongue H is held at a fixed elevation in the ring of the neck-yoke. The spur-wheel N is held in any desired position by a dog, P, engaging in one of the marginal notches of the wheel P', that is fixed to the cog-wheel shaft.

Figures 41, 42, 46, 47, 48:
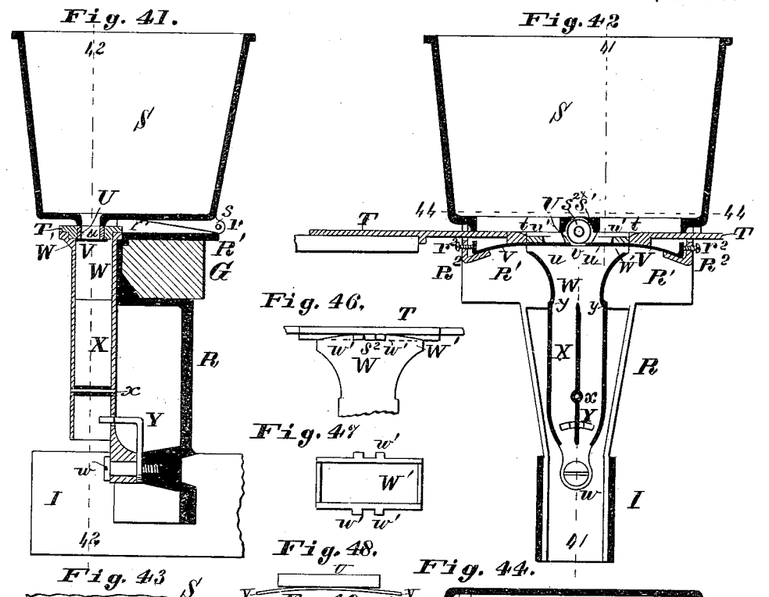
Fig. 41 is a section at 41 41, Fig. 42.
Fig. 42 is a vertical section at 42 42, Fig. 41.
Fig. 46 is a detail elevation of the upper end of the spout.
Fig. 47 is a top view of the spout.
Fig. 48 is a detail elevation of valve.

The rear ends of the openers I embrace the open-backed standards R. The standards are made to fit the openers at the lower end, and at the upper end, R', are extended laterally and made to embrace the bar G. (See Fig. 41.) The upper portion, R', forms a bracket, to which the seed-box S is hinged at $r$, the bracket R' being made with ribs $r'$ on its upper side and the seed-box being made with ribs $s$ at its bottom, that project before the front wall of the box a little distance, and are bored to receive the pintle of the hinge $r$, which passes also through the ribs $r'$, thus forming the hinge, as aforesaid. The arrangement is such that the feed-box can be turned over on its hinges $r$, and thus uncover the seed-slide T, to allow the removal of the seed-block U from its recess or mortise in the seed-slide. I prefer to make the seed-box cover to slide on, to allow the seed-box to be turned down without spilling the seed. By removing the lid and tilting the box its contents are discharged.

Figures 43, 44, 45, 49, 50:
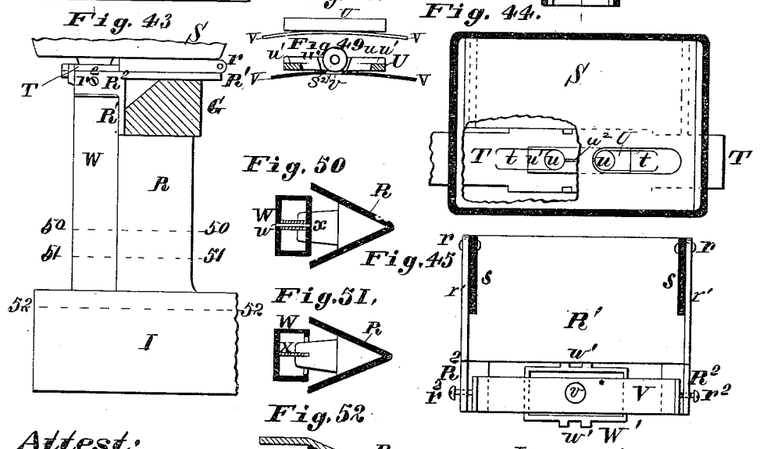
Fig. 43 is an end elevation of the dropper-leg with the cross-bar in section.
Fig. 44 is a section at 44 44, Fig. 42.
Fig. 45 is a top view of the dropper-leg with the seed-bar removed.
Fig. 49 is a vertical section of the valve.
Fig. 50 is a section at 50 50, Fig. 43.

The bracket R' has two brackets, $R^2$, at the rear sides, (see Fig. 42,) which are of angular shape, to receive and hold the ends of the spring-bar V, upon which the seed-block U rests. The seed-block U is contained in a vertical mortise or slot made through the seed-slide from top to bottom, and is sustained upon the spring-bar V. The construction is such that in case any object should become jammed in the seed-cavity or hole $u$ of the block and the seed-hole $v$ of the bar V, the bar will spring downward and allow the escape of the object. The bar V is bent in the form of an arch at the shoulders, the brackets $R^2$ forming abutments, and at the ends are abutment-screws $r^2$, by turning which the bar may be raised or lowered. One or both of the screws $r^2$ may be screwed into the bent end or ends of the spring-bar to hold it in place. The seed-block U is channeled out at $u'$ from the seed-holes $u$ to the ends of the block, and the seed slide or bar has beveling or inclined recesses $t$, forming continuations of the channels. Thus the outer sides of the seed-holes are lower than the inner sides, the construction causing the seed-holes to fill readily and certainly with grains of corn as they issue from beneath the bridge $s'$, beneath which they pass to discharge their loads through the orifice $v$ of the spring-bar V. To still further assist the filling of the seed-holes they are made in inclined directions in the blocks, as shown in Fig. 49, the rear side of the hole as it advances acting as a scoop to engage the grains and carry them down into the seed-hole.

W is the spout through which the grains fall, between the seed-box and the furrow. This spout is pivoted at the lower end, at $w$, to the standard R, so that it is capable of forming an oscillating bearing for the seed slide or bar. The upper end, W', of the spout is formed in the arc of a circle, of which the pivot $w$ is the center, so that as the spout swings from side to side transversely to the machine it shall support the end of the seed-slide T that lies upon it. (See Fig. 46.) The seed-slide is connected to the top of the spout by studs $s^2$ upon its under side, which engage between studs $w'$ at the sides of the top W'. (See Fig. 46.) By means of these studs the reciprocating movement of the seed-slide is communicated to the spout W.

X is a guide-plate and valve, oscillating on a pintle, $x$, and extending across the interior of the spout from front to back and from end to end, as shown.

Y is a forked arm fixed to the back of the standard R, and extending through a slot in the front side of the spout. The forked end of the arm engages the edge of the valve-plate X, and as the spout swings over to either side causes the upper end of the plate to swing over to a greater degree, so that the upper end of the valve-plate is brought in contact with the shoulder $z$ of the spout near the upper end, while at the same time the lower end of the valve-plate is brought in contact with the interior of the spout at the lower end. The construction is such that when the spout is thrown over to the left side the seed travels down between the right side of the valve-plate and spout, and is detained by the valve at the lower end of the spout until the spout commences to swing over to the other side and the positions of the parts are reversed.

The seed-slide is driven by a lever-arm, Z', of a vertical rock-shaft, Z, said arm passing through a staple, $t'$, upon the top of the seed-bar or slide. The arm $Z^2$ of the rock-shaft has a slot or orifice, $Z^3$, through which passes the screw-threaded stem of an eccentric, which is driven by the drive-wheel B through the medium of mechanism to be described hereinafter.

$a$ is an upright frame secured to the main frame and giving support to the mechanism to which allusion has just been made.

$b$ is a bevel-wheel upon the hub of the drive-wheel B, engaging a bevel-wheel, $c$, upon a vertical shaft, $d$, turning within a tubular shaft, $e$, and carrying at the upper end a spur-wheel, $f$, that engages a pinion, $h$, at the lower end of a vertical shaft, $i$, carrying at the upper end a spur-wheel, $j$, that engages a pinion, $k$, at the lower end of the hand-wheel shaft $l$, said shaft being in direct line with the shaft $d$, so that as both turn around together the hand-wheel shall not change position in its rotation.

The hand-wheel is marked $m$ and is fixed upon the upper end of the shaft $l$. This hand-wheel I have made in shape of a mushroom or section of a sphere with the convex side upward for the grasp of the hand of the driver. The shafts $i$ and $l$ have bearing in bracket $n$, hinged at $o$ to the standards $p$, said standards being fixed to the disk $q$. The disk or wheel $q$ is fast upon the upper end of the tubular shaft $e$. The construction is such that when that end of the bracket $n$ in which the shaft $l$ has bearing is forced downward the lower end of the shaft $i$ swings outward, and the pinion $h$ is carried out of engagement with the spur-wheel $f$. To hold the pinion $h$ in engagement with the wheel $f$ a spring-catch, $t'^{\times}$, engages the foot $n'$ of the bracket $n$. The cog-wheel $j$ has an angular hole in the hub which fits freely on an angular part of the shaft $i$, so that while the cog-wheel always turns with the shaft it admits of vertical adjustment thereon. The wheel $j$ is supported on a friction-block, $n^2$, forming a bearing in which the shaft $i$ turns. The hub of the wheel $j$ is recessed to receive an annular elastic cushion, $j'$, and a disk, $j^2$, through both of which the upper end of the shaft $i$ passes.

$i'$ is a nut screwed upon the top of the shaft $i$ and bearing upon the top of disk $j^2$, to cause a requisite amount of friction between the wheel $j$ and the friction-block $n^2$. The construction is such that the friction of the wheel $j$ upon the friction-block $n^2$ prevents the wheel from turning when the machine is in operation, and in consequence the bracket $n$, with all the parts having bearing in it, turn around with the disk or wheel $q$. When the hand-wheel is turned (by hand) either backward or forward, the spur-wheel $j$ is turned upon the friction-block and the positions of the wheel $f$ and disk $q$ changed relatively to each other, to delay or accelerate the dropping of the next pair of hills.

The disk $q$ has upon it an adjustable toe, $y'$, which is forked at the lower end, where it comes in contact with a click-spring, $z$, and indicates by sound the time the dropping takes place.

1 is an eccentric fixed to the lower end of the tubular shaft, and 2 is the hoop or yoke of the eccentric. 3 is the stem of the eccentric, screw-threaded to receive nuts 4 and 5.

6 is a sleeve upon the stem between the nuts, against whose ends the nuts screw. The sleeve 6 extends through the slot or orifice $Z^3$ in the rock-shaft arm $Z^2$. It will be understood that there is a proper amount of lost motion between the eccentric and the rock-shaft Z, the seed-bar T being allowed to remain at rest at the ends of its stroke to allow full time for the corn to leave its cavity in the seed-block. The nuts 4 and 5 are carried by the eccentric alternately against the arm $Z^2$ and serve to give the required motion to the arm. The sleeve 6 has the necessary length to give the required lost motion.

I will now describe the indicator which registers the movements of the hand-wheels. It has a standard-frame, 7, connected by a bracket, 8, to the bracket $n$. In the frame is a vertical shaft, 9, that is screw-threaded at its central part, and turns in a nut, 10, causing the nut to ascend or descend. 11 is a pointer on the nut, which travels, when the shaft is turned, before a scale, 12, on the standard 7 and indicates the distance traveled by the nut. The lower end of the indicator-rod 9 has an edge, 13, similar to a screw-driver, which rests in a notch, $i^2$, in the top of the shaft $i$, so that any rotary motion communicated to the shaft $i$ by the hand-wheel $m$ is registered upon the indicator, and at the end of the row any excess that the hand-wheel may have been turned in one direction over what it has been turned in the other is shown upon the scale.

To insure the emptying of the seed-cups $u$ when they arrive over the hole $v$, I provide a thin metal wheel, $s^{2\times}$, that turns in bearings underneath the cap $s'$ and occupies a longitudinal kerf or narrow slot, $u^2$, extending from cup to cup. It will be seen that as the cup $u$ reaches the place of discharge the wheel $s^{2\times}$ will push the grains down through the hole $v$.

The mechanism for dropping the marking material in line with the hills transversely to the direction in which the machine travels is similar in the main to that described in my Patent No. 221,282. 14 is a forked stud hinged to the seed slide or bar, and when elevated engaging the free end of arm 15 of the rocking valve-shaft 16. 17 and 18 are valves projecting from the rock-shaft in directions varying somewhat the one from the other, as shown, the valves being in parallel planes and working respectively against the upper and under side of the box-bottom 19. The arrangement is such that the material is alternately cut off at the top and bottom of the hole 20, and when cut off at top and opened at bottom the contents of the hole or cavity 20 drop on the ground in line with two hills.

21 is a pointer-arm used as a guide for the eye to indicate the distance of the machine from the last row planted. The arm may be of such length that will be in line between the eye of the driver and said row when the machine is the proper distance from the row. The pointer-arm is supported on the rear bar of the machine by means of an inclined hinge-bracket, 22, the arrangement being such that the arm will gravitate to a position transverse or nearly transverse to the machine. The arm is so hinged that it may be made to project from either side, and in case the arm comes in contact with any object in the forward movement of the machine, it is held back by the object until the machine has passed, when the arm swings forward on its hinge and regains its transverse position.

In a corn-planter where a ground-wheel is used to drive the dropping mechanism, it is necessary that the rim of the wheel should be kept clean, so that the circumference shall not vary. For this reason I use a scraper to clean the periphery of the drive-wheel.

The scraper has a bar, 23, centrally supported by a hanger and rod, 24, from the seat frame or stand O. At the ends of the bar 23 are wheels 25, whose edges bear against the inner side of the rims of the wheels A and B, so as to hold the edges of the hinged scrapers 26 in near proximity to the outside of the rims of the wheels. The scrapers are connected to the bars by hinges 27, that allow the edges of the scrapers to be brought in contact with the rims of the wheels, and the edges of the scrapers are (ordinarily) kept out of contact with the wheels by gravitation, owing to the manner in which they are supported on their hinges. The construction is such that when any earth is carried up on the rim of the wheel, the earth will come in contact with the edge of the scraper and carry it in contact with the wheel, and as the wheel turns, the scraper will remove the earth from the rim and will continue to operate as long as there is earth to be removed. When the wheel ceases to carry up any earth, the edge of the scraper will drop away from the wheel.

28 is a longitudinal screw-rod connecting the suspension or hanger rod to the rear post of the frame O. The purpose of the screw-rod 28 is to keep the wheels 25 in contact with the rims of the wheels A B.

29 is a scale-plate fixed to the standard $a$. $0^\times$ $1^\times$ $2^\times$ $3^\times$ is a scale thereon.

30 is a pointer, forked to embrace the shaft $e$, and clamped thereto by a slip-link, 31, embracing the pointer. The pointer revolves over the plate 29 as the seed-slide reciprocates, and indicates the position of the slide, which may be supposed to drop when the pointer is at $0^\times$, the numbers indicating the movement of the machine in feet.

Figure 1:
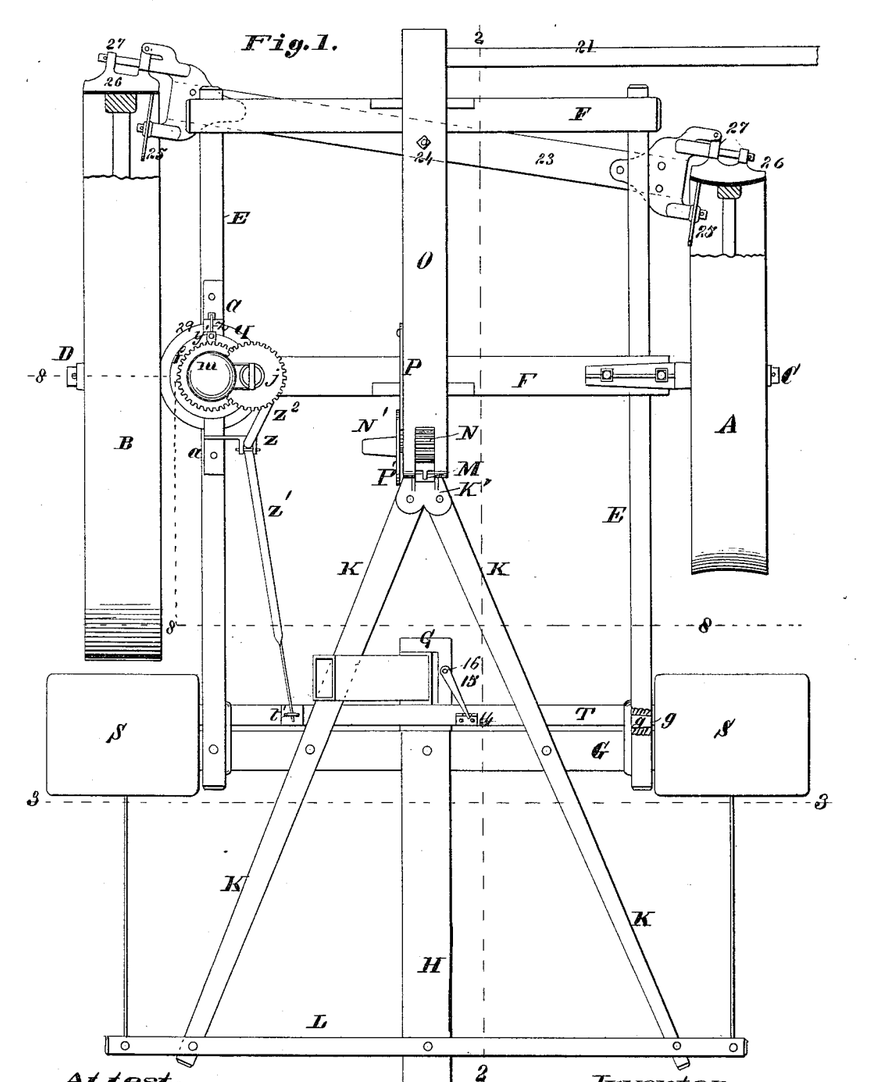
Figure 1 is a top view of the machine.
Figures 2, 3, 4, 5, 6, 7:
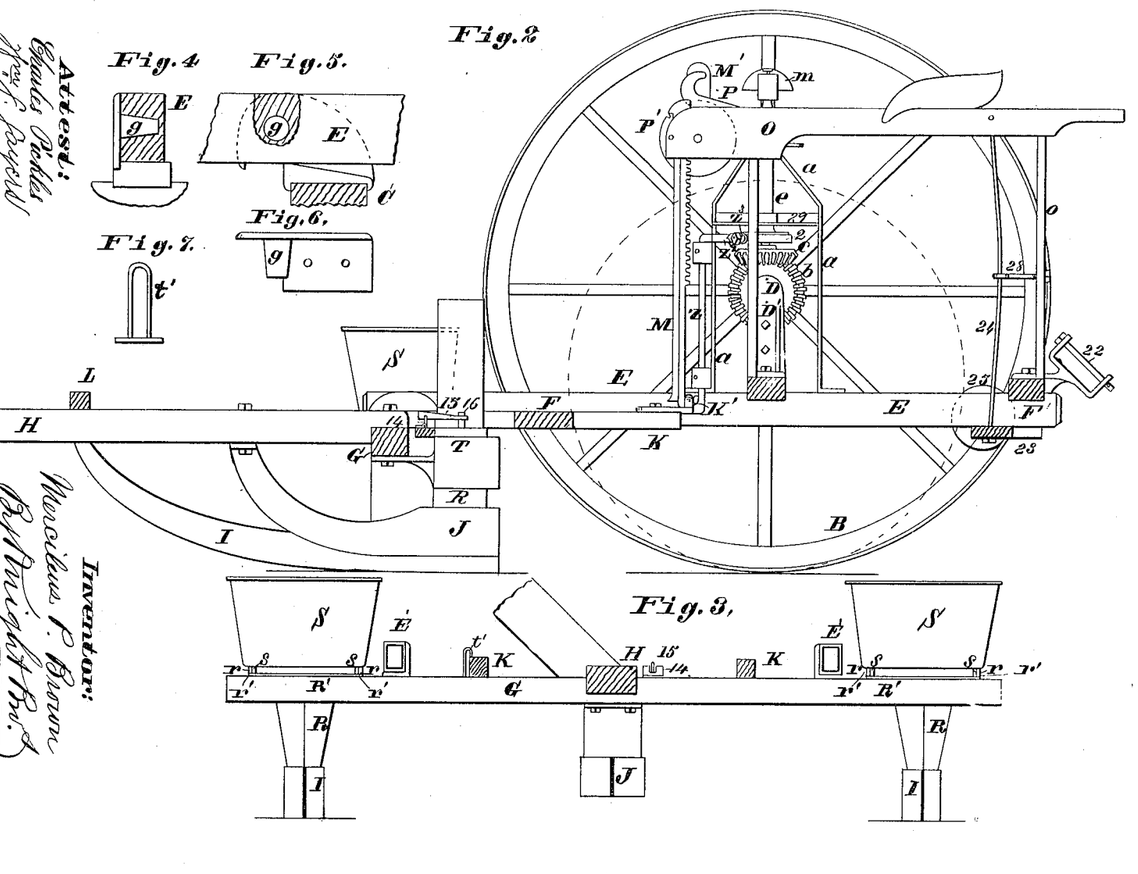
Fig. 2 is a section at 2 2, Fig. 1.
Fig. 3 is a section at 3 3, Fig. 1.
Figs. 4, 5, and 6 are enlarged details of the rocking frame by which the tongue is connected to the main frame.
Fig. 7 is an enlarged elevation of the staple upon the seed-bar which receives the end of the actuating-lever.
Figures 8, 9, 10, 11, 12, 13, 14, 15, 16:
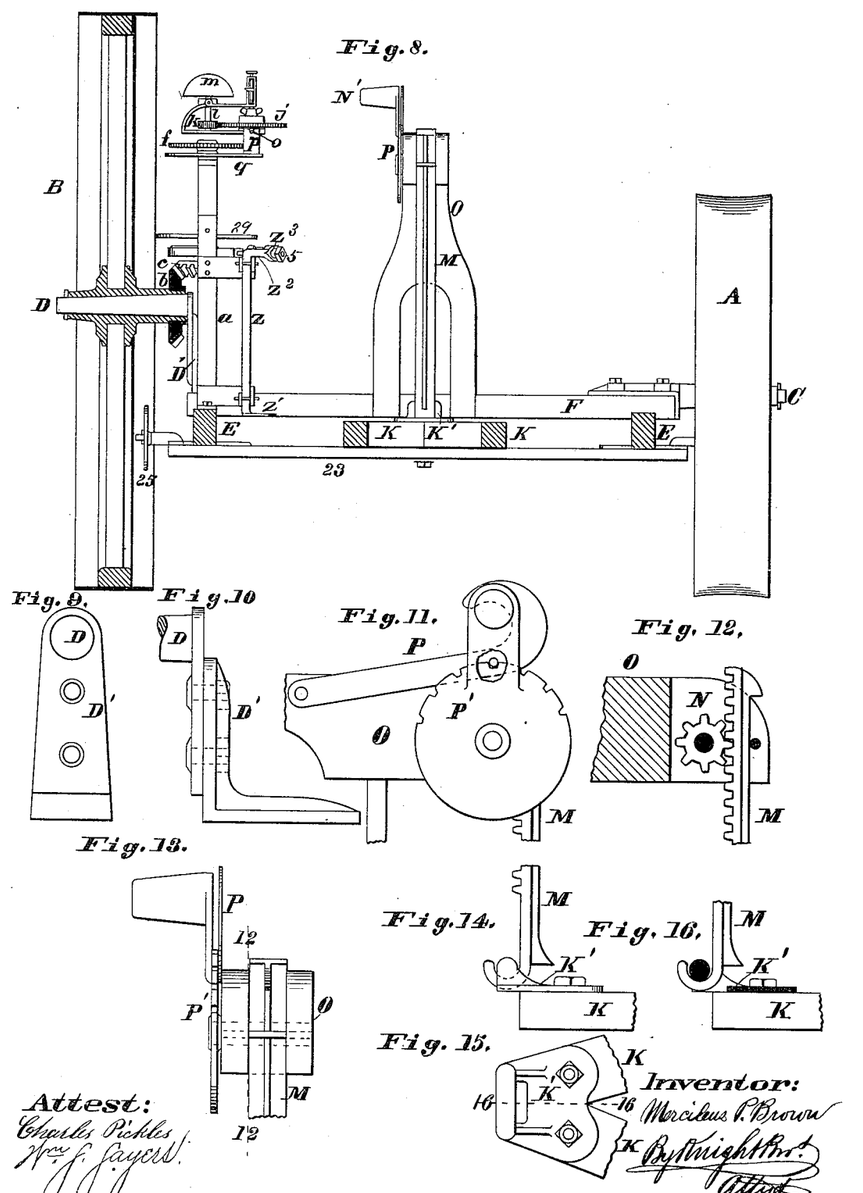
Fig. 8 is a section at 8 8, Fig. 1.
Figs. 9 and 10 are respectively front and side elevations of the standard to which the large or driving ground-wheel is connected.
Fig. 11 is a side elevation of the upper end of the raising and lowering device.
Fig. 12 is a vertical section at 12 12, Fig. 13.
Fig. 13 is an end elevation of the same parts shown in Fig. 11.
Fig. 14 is a side elevation, showing connection of cog-rack standard to plate.
Fig. 15 is a top view of the plate to which the cog-rack standard is connected.
Fig. 16 is a section at 16 16, Fig. 15.
Figure 17:
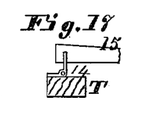
Figs. 17, 18, and 19 are detail figures showing the connection between the seed-bar and the valves of the hopper containing the marking material.
Figure 18:
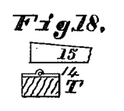
Figure 19:
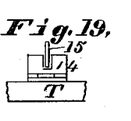
Figure 20:
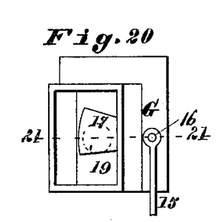
Fig. 20 is a top view of the marker-box.
Figure 21:
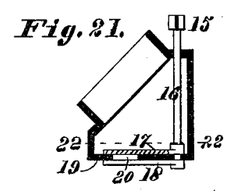
Fig. 21 is a section at 21 21, Fig. 20.
Figure 22:
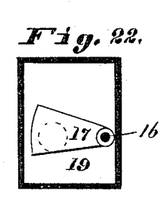
Figs. 22 and 23 are sections at 22 22, Fig. 21, showing the relative positions of the two valves.
Figure 23:
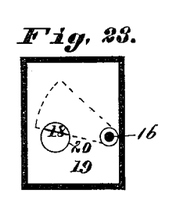
Figures 24, 25, 26, 27, 28, 29:
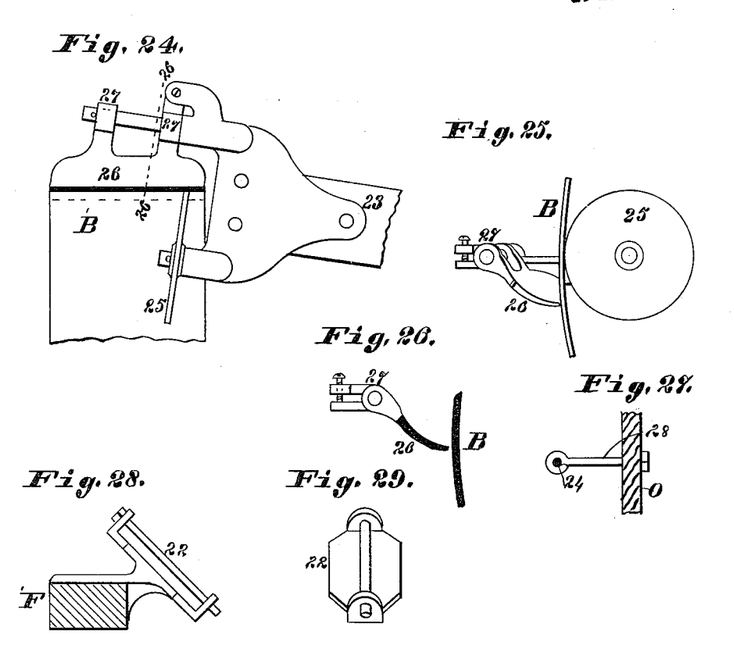
Fig. 24 is a detail top view of the scraper for the removal of earth from the periphery of the wheels.
Fig. 25 is an end elevation of the same.
Fig. 26 is a section at 26 26, Fig. 24.
Fig. 27 is a detail view of part of the adjustable bar of the scraper.
Fig. 28 is a side elevation of the hinge connecting the distance-indicating arm to the frame.
Fig. 29 is a back elevation of the same.
Figures 30, 37, 38, 39:
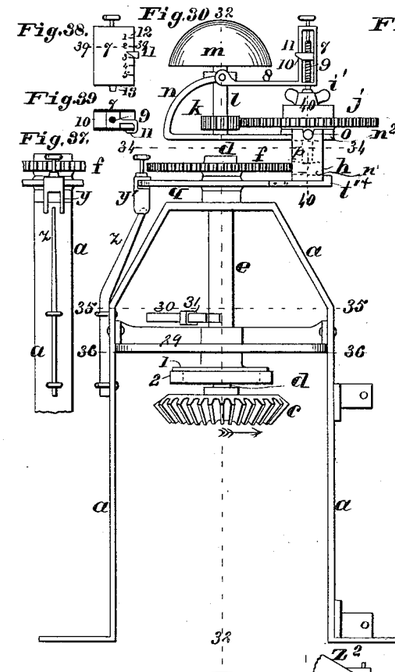
Fig. 30 is a side elevation of the dropping mechanism.
Fig. 37 is a detail side elevation of the click.
Fig. 38 is a side elevation of the register.
Fig. 39 is a horizontal section of same at 39 39, Fig. 38.
Figure 31:
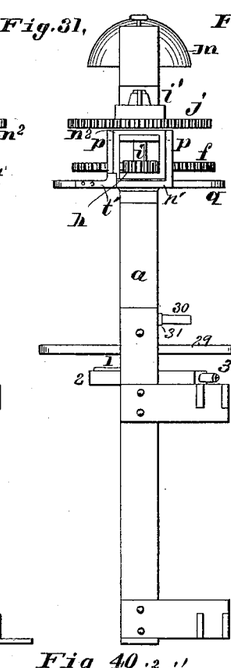
Figs. 31 and 32 are respectively an end elevation and vertical section of the same, the section being at 32 32, Fig. 30.
Figure 32:
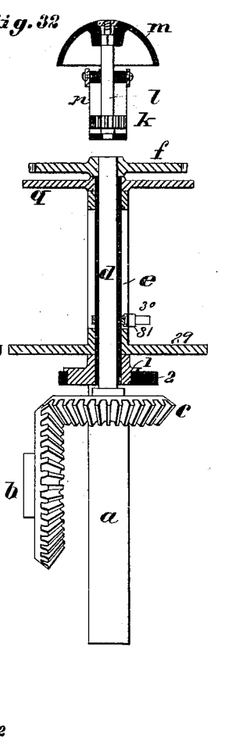
Figures 33, 40:
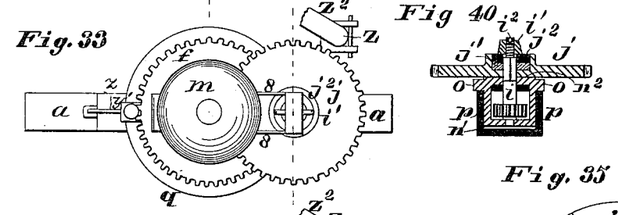
Fig. 33 is a top view of the dropping mechanism.
Fig. 40 is a section at 40 40, Fig. 30.
Figure 34:
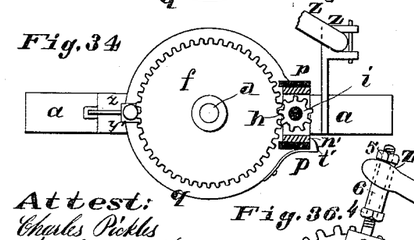
Fig. 34 is a section at 34 34, Fig. 30.
Figure 35:
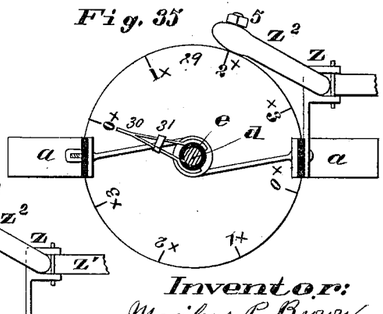
Fig. 35 is a section at 35 35, Fig. 30.

The operation of the machine is as follows: In moving it from place to place (when not planting) the hinged bracket $n$ is usually in such position that the pinions $h$ and wheel $f$ are out of engagement, thus breaking the connection between the drive-wheel B and the seed-bar T. The machine may be driven into proper position to drop the first hills of corn in two parallel rows. Then the disk or wheel $q$ is turned until the dropping takes place. This is indicated by the toe $y'$ acting on the click-spring $z$. The hand-wheel $m$ is then lifted, so as to move the bracket $n$ and put the wheels $h$ and $f$ into engagement. Then the machine is in condition to be driven forward, the dropping going on as it proceeds across the field. At the same moment that the corn drops upon the ground the marking material also drops, (if the marker is in operation,) the hinged stud being in the position shown in Figs. 17 and 19. If it is not desired to run the marker, the stud 14 is thrown down, as shown in Fig. 18, and the marking device remains inoperative. If from any roughness of the ground or from other cause the machine should drop the corn too early or too late, so as to make the hills out of line, (transversely with the rows already planted,) the hand-wheel $m$ is turned either a little faster than its normal speed to make the dropping a little later, (increasing the distance between the hills,) or the hand-wheel is grasped by the hand of the driver and its rotation retarded or stopped to cause the machine to drop earlier, thus decreasing the distance between the hills. These abnormal movements of the hand-wheel are registered by the indicator 11, and at the end of the "through" or row will be shown if the lines of the hills at right angles with the course of the machine are (in the aggregate) somewhat converging or diverging, and if such is the case the fault is corrected at the starting-point at one side of the field. To make the matter perfectly clear, it will be understood that ordinarily the solid shaft $d$, tubular shaft $e$, with the wheels $f$ and $q$ and the bracket or head $n$, all revolve together, owing to the friction between the wheel $j$ and the friction-block $n^2$, the friction preventing the wheel turning on its axis. If the hand-wheel $m$ is turned backward or forward relatively to its normal rotation, the wheels $j$ and $h$ are rotated with their shaft $i$, and the position of the bracket $n$ (and disk $q$, upon which it is supported) changed relatively to the wheels $c$ and $f$. Thus the eccentric 1 will be accelerated or retarded in its rotation, and the movements of the seed-bar influenced in the same manner. It will be understood that by means of the nut $i'$ the degree of friction between the wheel $j$ and friction-block is regulated, so as to cause the parts to revolve together, as has been stated, while at the same time the hand-wheel is allowed to turn with a proper degree of freedom.

When the pointer 30 points to $0^\times$ on the scale-plate 29, the machine will be in the act of dropping a hill of corn and also a deposit of marking material. When the pointer points to $1^\times$ the machine will travel one foot before dropping, and so on to the other numbers of the scale. Now supposing, for instance, when ready to start the machine at the end of the row the machine is one foot behind the first row, and the pointer indicates that dropping will take place when the machine has traveled two feet. Then before starting the machine the disk is turned by hand to bring the pointer to 1×. After this the bracket $n$ is thrown up to engage the wheel $h$ with the wheel $f$, and the machine is driven forward, and will drop after traveling one foot. In this way the machine may be made to drop the first hill in each row without locating it (the machine) in an exact position.

It will be understood that when the ends of the rows are reached the wheel $h$ is thrown out of engagement with wheel $f$, so that the dropping mechanism will remain at rest while turning the machine at the ends of the rows.

I claim as my invention—

1. The combination, with a seed-slide, of a spout hinged to oscillate beneath and to support the seed-slide.

2. The combination of a seed-slide and a spout, W, having a pivot on which it oscillates, and a curved face upon which the seed-slide rests, substantially as set forth.

3. The combination of a seed-slide having a mortise, a seed-block having seed-holes, and a spring-plate to support the block in the mortise, as set forth.

4. The adjustable spring-plate V, in combination with a seed-bar having a mortise, and a removable seed-block occupying the mortise and to rest on the spring-plate, as set forth.

5. The combination of a spout hinged at the bottom, and a valve-plate hinged within the spout, as set forth.

6. The combination of a standard having a forked arm fixed thereto, a spout to oscillate on the standard, having a slot on the front side to receive the arm, and a valve-plate hinged within the spout and engaged by the arm, as set forth.

7. The combination of a seed-slide, an oscillating spout supporting the seed-slide and moved by the latter, and lugs to lock the seed-slide and spout together, as set forth.

8. The combination of bar G, seed-box S, and hollow-backed standard R, provided with bracket R′, formed to embrace the bar G, and constituting the connection between the said bar and the seed-box S, substantially as set forth.

9. The combination of disk $q$, wheels $f\,h\,j\,k$, shafts $e\,d\,i\,l$, hand-wheel $m$, friction device $i'\,n^2$, and indicator 9 10 11, operated by connection with shaft $i$, for the purpose set forth.

10. The combination of spur-wheels $b\,c\,f\,h\,j\,k$, hand-wheel $m$, friction device composed of friction-plate $n^2$, shaft $i$, turning in said plate $n^2$ and carrying-wheel $j$, vertically adjustable on said shaft and turning therewith, and nut $i'$, pressing the wheel upon the friction-plate $n^2$, substantially as and for the purpose set forth.

11. The combination of a hand-wheel, $m$, upon a hinged bracket, $n$, carrying also shafts $i$ and $l$, wheels $f\,h\,k$, and friction-wheel $j$, and trains of mechanism communicating, respectively, with the drive-wheel B and the seed-slide, for the purpose set forth.

12. The combination of tongue H, hounds K, hinged bar G, and adjusting device consisting of rack M, pinion N, dog P, and notched wheel P′, substantially as set forth.

13. The combination of the pointer-bar 21 and an inclined hinge, 22, to which the pointer is secured, substantially as and for the purpose set forth.

14. The combination of hinged scraper 26 and guide-wheel 25, having bearing against the inner side of the wheel-rim, substantially as and for the purpose set forth.

15. A jointed scraper, 26, behind the ground-wheel B, with hinge 27 above a radial line extending from the axle of the wheel through the scraping-edge, for the purpose set forth.

16. The combination, with an adjusting device to the dropping attachment of a corn-planter, of an indicator consisting of threaded shaft 9, nut 10, having pointer 11, and a scale, 12, substantially as and for the purpose set forth.

MERCILEUS P. BROWN.

Witnesses:
JNO. A. STORM,
HENRY NEILL.